United States Patent [19]

Weber, Jr. et al.

[11] Patent Number: 4,504,635

[45] Date of Patent: Mar. 12, 1985

[54] PROCESS FOR THE PREPARATION OF POLYMERIC COMPOSITIONS

[75] Inventors: Robert J. Weber, Jr., Belle Mead; Donald F. Smith, Jr., Bridgewater, both of N.J.

[73] Assignee: Union Carbide Corporation, Danbury, Conn.

[21] Appl. No.: 545,684

[22] Filed: Oct. 26, 1983

Related U.S. Application Data

[63] Continuation-in-part of Ser. No. 438,497, Nov. 2, 1982, abandoned.

[51] Int. Cl.³ ............................................. C08G 63/76
[52] U.S. Cl. ................................. 525/450; 525/123; 525/162; 525/451; 526/320; 528/354; 528/355
[58] Field of Search ............... 525/450, 451, 123, 162; 526/320; 528/354, 355

[56] References Cited

U.S. PATENT DOCUMENTS

| Re. 29,131 | 2/1977 | Smith et al. | 260/77.5 AN |
|---|---|---|---|
| Re. 30,234 | 3/1980 | Sampson et al. | 525/162 |
| 2,914,556 | 11/1959 | Hostettler et al. | 260/484 |
| 2,945,012 | 7/1960 | Berens | 260/78.3 |
| 3,655,631 | 4/1972 | Fraser et al. | 260/78.3 R |
| 3,760,034 | 9/1973 | Critchfield et al. | 260/874 |
| 3,816,566 | 6/1974 | Critchfield et al. | 260/898 |
| 3,864,434 | 2/1975 | Critchfield et al. | 260/899 |
| 3,884,994 | 5/1975 | Critchfield et al. | 260/899 |
| 3,892,714 | 7/1975 | Sampson et al. | 260/77.5 CR |
| 4,000,218 | 12/1976 | Critchfield et al. | 260/858 |
| 4,034,017 | 7/1977 | Chang et al. | 260/859 R |
| 4,082,816 | 4/1978 | Fisk et al. | 260/855 |
| 4,188,472 | 2/1980 | Chang | 528/75 |
| 4,281,172 | 7/1981 | Knopf | 560/185 |
| 4,340,497 | 7/1982 | Knopf | 252/188.3 R |
| 4,368,320 | 1/1983 | Aldinger et al. | 528/355 |

FOREIGN PATENT DOCUMENTS

| 824269 | 7/1975 | Belgium. |
| 0044393 | 6/1981 | European Pat. Off.. |

*Primary Examiner*—Earl A. Nielsen
*Attorney, Agent, or Firm*—Steven T. Trinker

[57] ABSTRACT

Described herein is a process for the polymerization of a reactive monomer derived from the reaction product of a hydroxyalkyl acrylate or methacrylate and a lactone with other ethylenically unsaturated monomers. The resulting polymeric compositions can be made into high quality industrial finishes by incorporation of various conventional crosslinking agents, plus other normally used formulating ingredients.

26 Claims, No Drawings

PROCESS FOR THE PREPARATION OF POLYMERIC COMPOSITIONS

This application is a continuation-in-part of U.S. patent application Ser. No. 438,497, filed Nov. 2, 1982, now abandoned.

BRIEF SUMMARY OF THE INVENTION

TECHNICAL FIELD

This invention is directed in general to a process for the preparation of oligomeric and polymeric compositions, in particular, a process for the polymerization of a reactive monomer derived from the reaction product of a hydroxyalkyl acrylate or methacrylate and a lactone with other ethylenically unsaturated monomers. The oligomeric and polymeric compositions can be made into high quality industrial finishes by incorporation of various conventional crosslinking agents, plus other normally used formulating ingredients.

BACKGROUND ART

In the field of coating compositions, efforts have been made and are presently being made to increase the flexibility and hardness of cured coatings and finishes in order to make them more suitable for such uses as automotive finishes, appliance finishes, business machine finishes, house siding, general metal finishing and the like. The inclusion of epsilon caprolactone into coating compositions is known to increase the flexibility of the coating films. See, for example, U.S. Pat. No. Re. 30,234 in which epsilon caprolactone is reacted with a copolymer, e.g., styrene and 2-hydroxyethyl acrylate, and thereafter with a crosslinking agent, e.g., melamine formaldehyde, to give a crosslinked modified copolymer having desirable flexibility, hardness and chemical durability. The polymeric compositions of the present invention utilize novel compositions containing a reactive monomer derived from the reaction product of a hydroxyalkyl acrylate or methacrylate and a lactone, e.g., epsilon caprolactone, which can polymerize with other ethylenically unsaturated monomers and thereafter can be crosslinked to give polymeric coating compositions having a highly desirable combination of flexibility and hardness in addition to excellent adhesiveness, hydrolytic stability, chemical compatibility and solvent resistance. The novel compositions containing a reactive monomer derived from the reaction product of a hydroxyalkyl acrylate or methacrylate and a lactone, e.g., epsilon caprolactone, are described more fully in U.S. Patent Application Ser. No. 438,496, filed on Nov. 2, 1982, now abandoned, and in copending U.S. Patent Application Ser. No. 565,530, filed Dec. 29, 1983.

U.S. Pat. No. 3,655,631 describes, as in Example 1 thereof, the polymerization of epsilon-caprolactone with hydroxyethyl acrylate as initiator in the presence of 0.1% by weight of p-toluene sulphonic acid as catalyst at a temperature of 45° C. for a time of 4 hours. The catalyst is described as an organic acid catalyst selected from the group consisting of halogen substituted aliphatic carboxylic acids other than trichloroacetic acid, alkane sulphonic acids, benzene sulphonic acid and lower alkyl substituted benzene sulphonic acids. The product is described in said Example I as a solid unsaturated polyester having a molecular weight of about 960. Example 8 of said patent describes the polymerization of hydroxyethyl methacrylate and epsilon-caprolactone using 0.1% by weight of p-toluene sulphonic acid catalyst. The polyester product is described as having a molecular weight of 437 and being a viscous liquid. The polyesters produced in said patent have residual acid catalyst present in relatively large amounts (i.e., about 1000 parts per million). In Examples 1 and 8 the described polymerization is stated to be complete. The epsilon caprolactone.hydroxyethyl acrylate product of Example 1 was further copolymerized with styrene (Examples 2 and 3) and vinyl acetate (Example 4).

However, the presence of such strong acid catalyst in the polyester product could lead to degredation of the product. Also, its presence may decrease the shelf life and pot life of coating systems produced from oligomers containing the polyester product and certain crosslinking agents. The use of a polyester product containing such strong residual acids may generate highly colored by-products that may be detrimental in some coating applications.

U.S. Pat. No. 4,188,472 describes reacting (a) a lactone with an ester-containing acrylyl or alpha-substituted acrylyl group and one or two hydroxyl groups and (b) reacting the product of (a) with an isocyanate. Specifically, in Examples I to III, hydroxyethyl acrylate is added to epsilon-caprolactone which was heated to 130° C. (Example 1) or 120° C. (Examples II and III). Large amounts of catalyst such as TPT titanate (greater than 2000 parts per million—Example I) or a mixture of stannous octoate and dibutyltin dilaurate (greater than 1500 parts per million—Examples II and III) were added to the reaction mixture. Additionally, the reaction carried out in these Examples utilizes large amounts of inhibitor, i.e., greater than 5000 parts per million. The reaction is carried out at temperatures of 130° C. for 6 hours (Example I) and 120° C. for 8 hours (Examples II and III). The product of the reaction in these Examples is described as having a hydroxyl value of 162 (Example I), 318 (Example II) and 122 (Example III). In Example II the reaction is stated to be complete. The epsilon caprolactone.hydroxyethyl acrylate product of Examples I, II and III was further reacted with a diisocyanate.

However, the use of the large amounts of catalyst and inhibitor in the polymerization described in U.S. Pat. No. 4,188,472 can have deleterious effects on the subsequent use of the lactone modified resin in polymerization or copolymerization reactions and/or crosslinking reactions.

Eureopean Patent Application No. 0044 393A2 titled "Process For Production of A (Meth) Acrylate Resin With Hydroxyl Groups and Modified by Epsilon-Caprolactone" describes the reaction of at least one monoester of acrylic or methacrylic acid with an alkane diol with 2–4 carbon atoms in the molar ratio of 1.5:1 to 1:3 with epsilon-caprolactone. The reaction is described as occurring at a temperature of 60°–130° C. in the presence of an organotin compound. Specifically, in Example I an adduct from 2-hydroxyethyl acrylate and dibutyltin oxide are heated to 120° C. and epsilon-caprolactone is added over the course of two hours. This mixture is heated for two more hours at 120° C. This Example was repeated and the reaction product was shown to contain greater than 25 weight percent of unreacted 2-hydroxyethyl acrylate. The epsilon caprolactone.hydroxyethyl acrylate product of Example 1 was further polymerized with methyl methacrylate, 2-ethylhexyl acrylate and 2-hydroxyethyl acrylate.

DISCLOSURE OF THE INVENTION

The present invention is directed to a process for preparing a polymeric composition comprising polymerizing one or more ethylenically unsaturated monomers with a composition comprising:

(a) 0 to 10 weight percent, preferably 0 to 5 weight percent, of a lactone;

(b) greater than 0 weight percent to about 20 weight percent, preferably less than 10 weight percent, of hydroxyethyl acrylate or methacrylate;

(c) 2 or less weight percent, preferably 1 or less weight percent, of diacrylates;

(d) 10 or less weight percent, preferably 5 or less weight percent, of products resulting from Michael addition, acrylic polymerization, transesterification reactions, or other side reactions;

(e) remainder to 100 weight percent of a reactive monomer of the following formula:

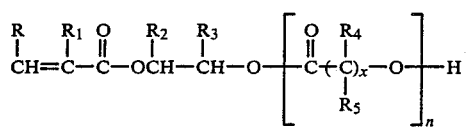
(I)

wherein R, $R_1$, $R_2$, and $R_3$ are independently hydrogen or methyl, $R_4$ and $R_5$ are independently hydrogen or alkyl of from 1 to 12 carbon atoms, x is from 4 to 7 and both n and the average value of n in the composition are equal to or greater than 1; and (f) less than about 200 parts per million, preferably less than about 100 parts per million, of catalyst.

The invention is further directed to a process for preparing a crosslinked polymeric coating composition comprising: (1) polymerizing one or more ethylenically unsaturated monomers with a composition comprising:

(a) 0 to 10 weight percent, preferably 0 to 5 weight percent, of a lactone;

(b) greater than 0 weight percent to about 20 weight percent, preferably less than 10 weight percent, of hydroxyethyl acrylate or methacrylate;

(c) 2 or less weight percent, preferably 1 or less weight percent, of diacrylates;

(d) 10 or less weight percent, preferably 5 or less weight percent, of products resulting from Michael addition, acrylic polymerization, transesterification reactions, or other side reactions;

(e) remainder to 100 weight percent of a reactive monomer of the following formula:

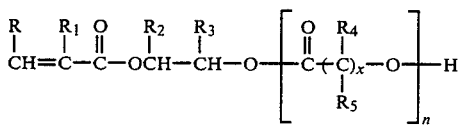
(I)

wherein R, $R_1$, $R_2$, an $R_3$ are independently hydrogen or methyl, $R_4$ and $R_5$ are independently hydrogen or alkyl of from 1 to 12 carbon atoms, x is from 4 to 7 and both n and the average value of n in the composition are equal to or greater than 1; and (f) less than about 200 parts per million, preferably less than about 100 parts per million, of catalyst; and (2) crosslinking the polymeric composition of (1) with an isocyanate resin or an amino resin selected from the group consisting of melamine formaldehydes, urea formaldehydes and benzoguanamine formaldehydes.

The coating compositions of this invention exhibit highly desirable flexibility and stability, chemical compatibility and solvent resistance. The polymeric composition and the crosslinked polymeric coating composition prepared by the above described processes are also part of this invention. As used in the specification and the claims hereof, oligomeric compositions are included within the meaning of the term "polymeric composition".

DETAILED DESCRIPTION

The novel compositions containing a reactive monomer derived from the reaction product of a hydroxyalkyl acrylate or methacrylate and a lactone utilized in the process of this invention in preparing the polymeric compositions and the crosslinked polymeric coating compositions are more fully described in U.S. Patent Application Ser. No. 438,496, filed on an Nov. 2, 1982, now abandoned, and in copending U.S. Patent Application Ser. No. 565,530, filed Dec. 29, 1983. The reactive monomer-containing compositions are prepared by reacting a lactone with a hydroxyalkyl acrylate or methacrylate. The lactone used as the starting material is characterized by the following formula:

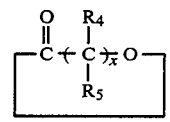

wherein $R_4$ and $R_5$ are hydrogen or alkyl of from 1 to 12 carbon atoms, and x is from 4 to 7. The preferred lactone is epsilon-caprolactone.

The hydroxyalkyl acrylates or methacrylates include 2-hydroxyethyl acrylate, hydroxypropyl acrylate, hydroxybutyl acrylate, 2-hydroxyethyl methacrylate, 2-hydroxypropyl methacrylate, 2-hydroxy-3-chloro propyl methacrylate, 2-hydroxy-3-chloro propyl acrylate, 2,3-dihydroxy propyl methacrylate, 2,3-dihydroxy propyl acrylate, and the like, or mixtures thereof. Hydroxyethyl acrylate is preferred.

The reactive monomer-containing compositions are prepared by reacting the lactone with the hydroxyalkyl acrylate or methacrylate in the presence of less than about 200 parts per million, preferably less than 100 part per million, of a catalyst. The catalyst which may be used herein includes one or more organometallic compounds and other metallic compounds such as stannic chloride or ferric chloride and other Lewis and protonic acids. Preferred catalysts include stannous octoate, dibutyltin dilaurate, and other tin compounds; titanates such as tetraisopropyl titanate and butyl titanate; and the like.

The reactive monomer preparation reaction is carried out at a temperature of from about 100° C. to about 140° C., preferably from about 120° C. to about 130° C. The reaction may be carried out at atmospheric pressure although higher or lower pressures may be used. The reaction is generally carried out in the presence of oxygen to inhibit polymerization of the hydroxyalkyl acrylate or methacrylate. The reaction is carried out for a period of from about 2 hours to about 20 hours, preferably from about 3 hours to about 11 hours.

The reactive monomer preparation reaction is carried out in the presence of a suitable inhibitor to prevent polymerization of the hydroxyalkyl acrylate or methacrylate double bond. These inhibitors include the monomethyl ether of hydroquinone, benzoquinone, phenothiazine, methylhydroquinone, 2,5-di-t-butylquinone, hydroquinone, and other common free radical inhibitors known in the art. The level of inhibitor used is less than 1000 parts per million, preferably less than 800 parts per million, and most preferably less than 600 parts per million.

The reactive monomer preparation reaction is carried out by adding the lactone to a reaction vessel and heating this to reaction temperature (about 100° C. to about 140° C.) while sparging the lactone with an inert gas such as nitrogen. The lactone may be dried with, for example, conventional agents such as molecular sieves before adding it to the reaction vessel. When the reaction temperature is achieved or soon thereafter, the inert gas sparge is changed to a mixture of inert gas and oxygen (such as air). Various alternatives may be used. For example, the system may be sparged with the inert gas and oxygen mixture for a short period of time, i.e., about 5 to 10 minutes, after which the sparge is discontinued, and the gas mixture then used only to flush the reactor vapor space throughout the reaction; or the inert gas sparge is stopped and the system is flushed with the mixture throughout the reaction; or the gas mixture may be sparged through the system while an inert gas is additionally used to flush the vapor space during the reaction period. Combinations of these alternatives may be used if desired.

The hydroxyalkyl acrylate or methacrylate may be mixed with the catalyst and inhibitor and this mixture added to the heated lactone. Alternatively, the inhibitor may be added to the lactone prior to heating. Also the lactone may be added to the hydroxyalkyl acrylate or methacrylate which has been heated, or all the reactants may be added initially to the reactor and the process carried out. Several variations in the mode of addition of the lactone, acrylate or methacrylate, catalyst and inhibitor may be used. The final reaction mixture is maintained at the reaction temperature for about 2 to 20 hours.

The reaction mixture is collected and may be used without purification. If desired the reaction mixture may be purified by conventional techniques such as vacuum stripping.

The reactive monomer preparation reaction may also be carried out in the presence of a suitable solvent which does not contain, for example, active hydrogens or polymerizable ethylenically unsaturated groups. These solvents include ketones, esters, ethers, aromatic and aliphatic hydrocarbons, and the like, or mixtures thereof. Preferred solvents include esters, such as Cellulose acetate.

Preferably, epsilon-caprolactone is reacted with hydroxyethyl acrylate or methacrylate in the ratio of one mole of the acrylate or methacrylate to from one to 12 moles of the lactone. These novel compositions containing a reactive monomer derived from the reaction product of a hydroxyalkyl acrylate or methacrylate and a lactone may be solid or liquid, and the most preferred compositions are liquid.

The most preferred reactive monomer-containing commpositions are produced by reacting epsiloncaprolactone with hydroxyethyl acrylate or methacrylate in a ratio of one mole of the hydroxyethyl acrylate or methacrylate to two or three moles of the epsilon-caprolactone. These preferred compositions contain the reactive monomers of formula (I), 0 to 5 weight percent of lactone, less than 10 weight percent of hydroxyethyl acrylate or methacrylate, minor amounts of additional reaction product, 400 to 600 parts per million of inhibitor, and catalyst residues in amounts of about 50 parts per million.

The oligomeric and polymeric compositions and crosslinked oligomeric and polymeric coating compositions of this invention can be prepared by conventional polymerization techniques in which the novel reactive monomer-containing composition is blended with one or more ethylenically unsaturated monomers in the presence of solvents, chain transfer agents and polymerization catalysts and heated to about 100° C. to 200° C. for about 2 hours to 6 hours. Solvents which can be used in these conventional polymerization techniques are well known in the art and include for example, methyl normal-amyl ketone (2-heptanone), normal-butyl alcohol, methyl ethyl ketone (2-butanone) and the like. Suitable chain transfer agents include t-dodecylmercaptan and the like. Suitable polymerization catalysts include, for example, azo-bis-isobutyronitrile, benzoyl peroxide and the like.

Suitable ethylenically unsaturated monomers which can be employed in the process of this invention include among others hydroxyl functional acrylic monomers, the esters of acrylic or methacrylic acid and monohydric alcohols, alpha, beta ethylenically unsaturated carboxylic acids and vinyl hydrocarbons. The hydroxyl functional acrylic monomers can include 2-hydroxyethyl acrylate, 2-hydroxyethyl methacrylate and the like. Suitable esters of acrylic or methacrylic acid and monohydric alcohols include among others ethyl acrylate, n-butyl acrylate, t-butyl acrylate, isobutyl acrylate, 2-ethylhexyl acrylate, hexyl acrylate, decyl acrylate, cyclohexyl acrylate, methyl methacrylate, ethyl methacrylate, propyl methacrylate, isopropyl methacrylate, butyl methacrylate, isobutyl methacrylate, lauryl methacrylate and the like. The preferred esters are ethyl acrylate and butyl acrylate. Suitable alpha, beta ethylenically unsaturated carboxylic acids include among others acrylic acid, methacrylic acid, itatonic acid, crotonic acid and the like. Preferred are acrylic acid and methacrylic acid. Suitable vinyl hydrocarbons include, for example, styrene, alpha methylstyrene, vinyl toluene, t-butylstyrene, chlorostyrene and the like. The preferred vinyl hydrocarbon is styrene. Other monomers such as vinyl acetate, acrylonitrile, vinyl chloride, methacrylonitrile and the like can also be included in the polymeric compositions of this invention.

The concentration of the novel reactive monomer in the polymeric compositions of this invention can range from about 5 to about 90 weight percent, preferably from abut 20 to about 40 weight percent. The concentration of the other ethylenically unsaturated monomers in the polymeric compositions of this invention can range from about 90 to about 5 weight percent, preferably from about 60 to about 80 weight percent. The number average molecular weight of the polymeric compositions of this invention can range from 1,000 or less to about 100,000 or greater.

The polymeric compositions of the present invention utilize epsilon caprolactone in novel reactive monomer compositions which are reacted with other ethylenically unsaturated monomers by addition polymerization. Epsilon caprolactone is not grafted into the polymeric compositions. It is believed that a unique distribution of caprolactone along the polymer backbone is obtained by addition polymerization of the reactive monomer as opposed to polymers prepared by the grafting reaction. Polymeric compositions prepared by either addition polymerization or grafting of caprolactone can contain the same amount of caprolactone but the distribution of caprolactone along the polymer backbone would be different. In grafting, the caprolactone distributes along the polymer backbone in a statistical manner whereas, in addition polymerization of a caprolactone-containing reactive monomer, the caprolactone is distributed in a nonstatistical manner. Unique coating properties can be obtained utilizing the polymeric compositions of the present invention as opposed to polymeric compositions grafted with caprolactone. Also in the grafting reaction caprolactone may react with any acidic monomers used in preparing the polymer, whereas by using the caprolactone-containing reactive monomers, no reaction with acidic monomers will occur.

The crosslinkable polymeric coating compositions of this invention contain an isocyanate resin or an amino resin selected from the group consisting of melamine formaldehydes, urea formaldehydes and benzoguanamine formaldehydes. A melamine formaldehyde resin is preferred such as hexamethoxymethyl melamine. Butylolated melamine formaldehydes can also be used. The concentration of the amino resin in the polymeric coating compositions of this invention can range from about 10 to about 50 weight percent of the total weight of the coating composition.

The crosslinkable polymeric coating compositions can also contain an organic solvent and a catalyst as optional components. Any of the conventional solvents used in the coatings industry can be used at a concentration preferably below 50 weight percent of the total weight of the coating composition. While large amounts could conceivably be used, the use of larger amounts would destroy the high solids nature of the coating; solvents are generally added in the small amounts indicated to improve flowability during application of the coating composition to the substrate.

In some instances an acid catalyst might be desired to improve the efficiency of the isocyanate resin or amino resin crosslinking reaction during curing. The concentration of the catalyst can vary from zero to about 10 weight percent based on the total weight of the coating composition. The particular catalyst used and its concentration are dependent to a degree upon its catalyst activity and the specific components present in the coating composition. These catalysts are known to those skilled in the art and include hydrochloric acid, sulfuric acid, p-toluene sulfonic acid, methane sulfonic acid, dodecylbenzene sulfonic acid, phosphoric acid and its alkyl derivatives, maleic acid, trimellitic acid, phthalic acid, succinic acid, and the like.

The crosslinkable polymeric coating compositions can also contain pigments, fillers, and other additives conventionally present in coating compositions in their conventional quantities. The particular ones selected are of no consequence to the basic invention. In preparing the crosslinkable polymeric coating compositions, the ingredients are mixed by the conventional procedures used in the production of paints, inks or coating compositions. These procedures are so well known to those skilled in the art that they do not require further discussion here.

The crosslinkable polymeric coating compositions are applied to a surface or substrate by conventional means and then thermally cured by heating at a temperature of about 100° C. to 375° C. preferably from 125° C. to 200° C. for a period of time sufficient to obtain a dry film. Generally, this time will range from about one minute to two hours. The components present in a particular crosslinkable polymeric coating composition will determine the temperature and time that will be required to obtain an adequate cure and a good film coating.

The crosslinkable polymeric compositions of this invention can be high solids coating compositions and they can contain as much as 90 weight percent or more solids therein. Generally the total solids content of the coatings compositions of this invention range from about 25 to 90 weight percent, preferably from about 50 to 90 weight percent, of the total weight of the coating composition.

The cured coating compositions were evaluated according to the following procedures:

Forward Impact Resistance: a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the coating side of the coated steel panel. The inches times pounds, designated inch-pounds, absorbed by the film without rupturing was recorded as the films forward impact resistance.

Pencil Hardness: pencil leads of increasing hardness values were forced against the film coating surface in a precisely defined manner until one pencil lead marred the surface of the film coating. The surface hardness was considered as the hardest pencil grade which just failed to mar the film coating surface. The pencil leads in order of softest to hardest were reported as follows: 6B, 5B, 4B, 3B, 2B, B, HB, F, H, 2H, 3H, 4H, 5H, 6H, 7H, 8H, and 9H.

Solvent Resistance: a measure of the resistance of the cured film to attack by methylethyl ketone (MEK) and was reported as the number of rubs or cycles of methylethyl ketone soaked cheesecloth required to remove one half of a cured film from the test area. This test was performed by stroking the cured film with a methylethyl ketone soaked cheesecloth until that amount of film coating was removed. The number of cycles required to remove this amount of coating was a measure of the coating solvent resistance.

Reverse Impact Resistance: a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the uncoated side of the coated steel panel. The inches times pounds, designated inch-pounds, absorbed by the film without rupturing was recorded as the films reverse impact resistance.

Crosshatch Adhesion: a lattice pattern with either six or eleven cuts in each direction was made in the coating film to the substrate and pressure-sensitive adhesive tape was applied over the lattice pattern and then removed. The adhesion was evaluated by comparison with descriptions and illustrations as more fully detailed in ASTM D 3359-78.

Gravelometer: standardized steel shot was projected by means of a controlled air blast at the coated film specimens at a temperature of −10° C. The resultant chipping effect was evaluated by comparison with a set of photographic standards as more fully detailed in ASTM D 3170-74.

Specular Gloss: a measure of the specular gloss of nonmetallic specimens for glossmeter geometries of 60°, 20°, and 85° as more fully detailed in ASTM D 523-80.

Distinctness of Image: a set of images reflected from a coated surface are compared with a standard set of images corresponding to a given distinctness of image rating value. Rating values are from zero to 100 increasing in increments of 10. The instrument used in this test was a DOI 300 manufactured by Mechanical Design and Engineering Company, Burton, Mich.

The following examples are illustrative of the present invention and are not intended as a limitation upon the scope thereof. As used in the examples appearing hereinafter, the following designations, terms and abbreviations have the indicated meanings:

in.-lbs.—inch-pounds
gm—gram
mg—milligram
°C.—Centrigrade degree
°F.—Fahrenheit degree
caprolactone—epsilon-caprolactone
STY—styrene
BA—n-butyl acrylate
HEA—2hydroxyethyl acrylate
AA—acrylic acid
HEA.nCl—n-mole caprolactone adduct of HEA
CL—caprolactone
EA—ethyl acrylate
TBA—t-butyl acrylate
MMA—methyl methacrylate
DA—decyl acrylate
CHA—cyclohexyl acrylate
HEMA—2-hydroxyethyl methacrylate
HEMA.nCL—n-mole caprolactone adduct of HEMA
VCL—vinyl chloride
VAc—vinyl acetate
Reactive Monomer I—A composition prepared in Example 1 containing a caprolactone modified hydroxyethyl acrylate reactive monomer having an average of two equivalents of caprolactone per equivalent of hydroxyethyl acrylate, and having the properties described in Example 1.
Reactive Monomer II—A composition prepared in Example 2 containing a caprolactone modified hydroxyethyl acrylate reactive monomer having an average of two equivalents of caprolactone per equivalent of hydroxyethyl acrylate, and having the properties described in Example 2.
Reactive Monomer III—A composition prepared in Example 3 containing a caprolactone modified hydroxyethyl methacrylate reactive monomer having an average of two equivalents of caprolactone per equivalent of hydroxyethyl methacrylate, and having the properties described in Example 3.
Reactive Monomer IV—A composition prepared in Example 6 containing a caprolactone modified hydroxyethyl acrylate reactive monomer having an average of four equivalents of caprolactone per equivalent of hydroxyethyl acrylate, and having the properties described in Example 6.
Reactive Monomer V—A composition prepared in Example 7 containing a caprolactone modified hydroxyethyl acrylate reactive monomer having an average of six equivalents of caprolactone per equivalent of hydroxyethyl acrylate, and having the properties described in Example 7.
Reactive Monomer VI—A composition prepared in Example 8 containing a caprolactone modified hydroxyethyl acrylate reactive monomer having an average of ten equivalents of caprolactone per equivalent of hydroxyethyl acrylate, and having the properties described in Example 8.
Initiator I—A polymerization initiator commercially available from E. I. du Pont de Nemours and Company as VAZO 52 ®.
Catalyst I—A composition commercially available from American Cyanamide Company as Cycat 4040 ®.
Catalyst II—Stannous octoate.
Catalyst III—Dibutyltin dilaurate.
Crosslinker I—A methylolated melamine commercially available from American Cyanamid Company as Cymel 303 ®.
Crosslinker II—A multifunctional isocyanate commercially available from Mobay Chemical Company as Desmodur N-75 ®.
Dispersing Aid I—A dispersing aid for grinding pigment commercially available from Tenneco Chemical Company as Neosperse 657 ®.
Catalyst IV—A composition commercially available from American Cyanamid Company as Cycat 500 ®.

EXAMPLE 1

A 500 milliliter glass reaction flask was equipped with a stirrer, thermometer, condenser, and nitrogen inlet and outlet tubes and used as the reaction vessel. Epsilon-caprolactone was dried by contacting it with molecular sieves for about 30 minutes. Then, 228 grams of the dried epsilon-caprolactone were introduced into the reaction vessel and heated to 140° C. while sparging the system with nitrogen. When the temperature reached 140° C., the nitrogen sparge was changed to an air sparge and a mixture of 116 grams of 2-hydroxyethyl acrylate, 0.0366 grams (106 ppm) of stannous octoate an 0.027 grams (78 ppm) of the monomethyl ether of hydroquinone was added over a ten minute period. The reaction mixture was held at 140° C. for six hours, cooled to room temperature (about 25° C.), and collected as a residue product. The product had a hydroxy number of 148.7, an acid number of 3.41, and a Brookfield viscosity of 98 centipoise (at 25° C.).

EXAMPLE 2

A five liter glass reaction flask sparged as described in Example 1 was used as the reaction vessel. A charge of 2,736 grams of epsilon-caprolactone was introduced into the reaction vessel and heated to 140° C. while sparging with nitrogen. When the temperature reached 140° C., the nitrogen sparge was changed to an air sparge which was used for about five minutes and then changed to a flush of air which was continued during the reaction period. Then a mixture of 1,392 grams of 2-hydroxyethyl acrylate, 0.208 grams (50 ppm) of stannous octoate, and 1.30 grams (315 ppm) of the monomethyl ether of hydroquinone was added over a 25 minute period. The reaction mixture was held at 140° C. for five hours, cooled to room temperature (about 25° C.), and collected as a residue product. The residue product had a hydroxyl number of 159, an acid number of 3.29, and a Brookfield viscosity of 115 centipoise (at 25.5° C.). Carbon-13 nuclear magnetic resonance studies indicated the final product contained 7.8% by weight 2-hydroxyethyl acrylate, an average value of n in Formula I of 2.8 and nil epsilon-caprolactone.

EXAMPLE 3

A 500 milliliter glass reaction flask equipped as described in Example 1 was used as the reaction vessel. A charge of 456 grams of epsilon-caprolactone was introduced into the reaction vessel an heated to 140° C. while sparging with nitrogen. When the temperature reached 140° C. the nitrogen sparge was changed to an air sparge, and a mixture of 260 grams of 2-hydroxyethyl methacrylate, 0.036 grams (50 ppm) of stannous octoate, and 0.217 grams (303 ppm) of the monomethyl ether of hydroquinone was added over a five minute to six minute time period. The reaction mixture was held at 140° C. for six hours, cooled to room temperature (about 25° C.) and stored as a residue product. The product had a hydroxy number of 141.7.

EXAMPLES 4 THROUGH 8

A suitable glass reaction vessel similar to that described in Example 1 was used. The ingredients used are described in Table A.

TABLE A

| Example | 4 | 5 | 6 | 7 | 8 |
|---|---|---|---|---|---|
| Ingredients | | | | | |
| Epsilon-caprolactone, gm. | 2,046 | 684 | 912 | 3,529 | 3,747 |
| 2-Hydroxyethyl acrylate, gm. | 2,082 | 232 | 232 | 599 | 381 |
| Stannous octoate | | | | | |
| grams | 0.208 | 0.052 | 0.073 | 0.208 | 0.208 |
| ppm | 50 | 57 | 64 | 50 | 50 |
| Monomethyl ether of hydroquinone | | | | | |
| grams | 1.30 | 0.325 | 0.325 | 1.30 | 1.30 |
| ppm | 315 | 355 | 284 | 315 | 315 |

The epsilon-caprolactone was introduced into the reaction vessel and heated to 140° C. while sparging with nitrogen. When the temperature reached 140° C., the nitrogen sparge was changed to an air sparge and a mixture of the other three ingredients was added to the caprolactone. The time to feed the mixture and time held at the reaction temperature of 140° C. is given in Table B. After the reaction time had elapsed, the product was cooled to room temperature (about 25° C.), and stored as a residue product. The analysis of the residue products is given in Table B.

TABLE B

| Example | 4 | 5 | 6 | 7 | 8 |
|---|---|---|---|---|---|
| Feed Time, min. | 20 | 5 | 4 | 5 | 1 |
| Reaction Time, hr. | 5 | 6 | 6 | 5.5 | 7 |
| Hydroxyl Number | 244.5 | 114.3 | 84.5 | 75.3 | 42.5 |
| Acid Number | 3.69 | 1.85 | 1.31 | 2.44 | 2.47 |
| Viscosity, cps (room temp.) | 151 | 189 | — | — | — |
| Appearance | liquid | slush | solid | solid | solid |

EXAMPLE 9

A 5000 milliliter glass reaction flask was equipped with a stirrer, a thermometer fitted with a temperature controller, a condenser, and gas sparging tube. A 2052 gram charge of dry (~100 ppm H$_2$O) epsilon-caprolactone and 0.975 grams of the monomethyl ether of hydroquinone was added to the flask. A nitrogen sparge was bubbled below the liquid surface as the material was heated to 130° C. The sparge was switched from nitrogen to air and maintained below the surface for 10 minutes and the sparge tube was then raised above the liquid surface and the air space was flushed with air during the remainder of the reaction.

A charge of 1044 grams of 2-hydroxyethyl acrylate containing 0.155 grams stannous octoate was added over 30 minutes and the reaction was then maintained at 130° C. for about 10 hours and then allowed to cool to room temperature.

A $^{13}$C NMR analysis showed 7.6 weight percent of 2-hydroxyethyl acrylate, nil epsilon-caprolactone, and an average value of n in Formula I of 2.7. The viscosity of the product was 84 cps.

EXAMPLE 10

A 5000 milliliter glass reaction flask was equipped with a stirrer, a thermometer fitted with a temperature controller, a condenser, and gas sparging tube. A 2052 gram charge of dry (~100 ppm H$_2$O) epsilon-caprolactone and 1.625 grams of the monomethyl ether of hydroquinone was added to the flask. A nitrogen sparge was bubbled below the liquid surface as the material was heated to 130° C. and for 30 minutes after reaching 130° C. The sparge below the surface was switched from nitrogen to air and a nitrogen flush of the air space above the liquid surface was begun.

A charge of 1044 grams of 2-hydroxyethyl acrylate containing 0.155 grams stannous octoate was added in a single batch. The reaction was maintained at 130° C. for eight hours and then allowed to cool to room temperature.

A liquid chromatographic analysis of the product showed it to be identical to that of Example 3.

EXAMPLE 11

A nitrogen flushed 50 gallon, glass-lined reactor was charged with about 242 pounds of dry (~100 ppm H$_2$O) epsilon-caprolactone and 100 grams of the monomethyl ether of hydroquinone. Nitrogen was sparged into the liquid as it was heated to 100° C. over about 1.5 hours. The sparge was then switched to air, and an additional flush of nitrogen was then added to the reactor vapor space during the remainder of the reaction. After sparging with air for 1.5 hours, a charge of 124 pounds of 2-hydroxyethyl acrylate containing 8.8 grams of stannous octoate was then heated to 125° C.–130° C. over about two hours. The reaction was held at this temperature for about 8.5 hours and then cooled to about 65° C. over 1.5 hours before being discharged.

The product mixture contained 7.7 percent by weight 2-hydroxyethyl acrylate, less than four percent caprolactone, and about 580 parts per million of monomethyl ether of hydroquinone. The average value of n in Formula I was 2.7 and the product had a viscosity of 84 cps.

EXAMPLE 12

Part A: Preparation of Monomer Mixture

A monomer mixture was prepared by combining 110.8 grams of Reactive Monomer I with 79.4 grams of styrene, 98.8 grams of n-butyl acrylate and 8.2 grams of acrylic acid. To the monomer mixture was added 6.8 grams of t-dodecylmercaptan, four grams of Initiator I dissolved in 30 grams of ethoxyethyl acetate and 65 grams of a mixture of ethoxyethyl acetate/toluene in a 2:1 weight ratio.

Part B: Preparation of Resin Solution

Into a one liter, three-neck reaction flask equipped with a nitrogen inlet and outlet, condenser, thermometer, stirrer, and monomer mixture addition tube was added 30 grams of ethoxyethyl acetate which was heated to 115° C. At this temperature, the above monomer mixture was added into the reaction flask through the monomer mixture addition tube over a period of three hours. The addition of a monomer mixture was regulated by means of a mechanical metering pump. After the addition of all the monomer mixture into the reaction flask, the temperature of the contents in the flask was lowered to 80° C. and 1.0 grams of Initiator I (post reaction) in 10 grams of ethoxyethyl acetate was added dropwise over a period of 15 minutes. The temperature was maintained at 80° C. for one additional hour following the dropwise addition of Initiator I and the resulting resin solution was thereafter removed from the reaction flask. The resin solution contained 61 percent by weight solids and had a hydroxyl number of approximately 117 mg KOH/gm resin.

Part C: Preparation of Cured Coating Composition

A coating composition was prepared containing 162.9 grams of the above resin solution, 46.8 grams of Crosslinker I, 0.83 grams of Catalyst I and 4.95 grams of n-butanol. The coating composition was mixed until homogeneous and then applied to Bonderite 100 ® treated steel panels using a drawdown blade with a four mil wet film clearance. The coating film was air dried for about 20 minutes and then cured by baking for 20 minutes at 150° C. The cured coating film was thereafter cooled to ambient temperature before testing for the specific properties designated in Table C. The results of the testing are given in Table C.

EXAMPLE 13

The preparation of the monomer mixture in Example 12 was repeated with the exception that the following ingredients were used in the following amounts:
  Reactive Monomer IV—150.3 grams
  Hydroxyethyl acrylate—30.6 grams
  Styrene—119.4 grams
  Butyl acrylate—148.5 grams
  Acrylic acid—12.3 grams
  t-Dodecylmercaptan—10.6 grams
  Initiator I—6.2 grams in 50 grams 2-heptanone This mixture gives an average of two equivalents of caprolactone per equivalent of hydroxyethyl acrylate.

The preparation of the resin solution in Example 12 was repeated with the exception that the 30 grams of ethoxyethyl acetate were replaced with 75 grams of 2-heptanone and the post-reaction initiator used was Initiator I (1.0 grams in 28.7 grams 2-heptanone). The resulting resin solution contained 67 percent by weight solids and had a hydroxy number of approximately 88 mg KOH/gm resin.

The preparation of the cured coating composition in Example 12 was also repeated with the exception that the following ingredients were used in the following amounts:
  Above Resin Solution—149.7 grams
  Crosslinker I—35.2 grams
  Catalyst I—0.83 grams
  n-Butanol—4.95 grams The cured film coating was tested for the specific properties designated in Table C. The results of the testing are given in Table C.

EXAMPLE 14

The preparation of the monomer mixture in Example 12 was repeated with the exception that the following ingredients were used in the following amounts:
  Reactive Monomer V—93.0 grams
  Hydroxyethyl acrylate—27.2 grams
  Styrene—79.6 grams
  Butyl acrylate—99.0 grams
  Acrylic acid—8.2 grams
  t-Dodecylmercaptan—7.07 grams
  Initiator I—4.2 grams in 20 grams 2-heptanone This mixture gives an average of two equivalents of caprolactone per equivalent of hydroxyethyl acrylate.

The preparation of the resin solution in Example 12 was repeated with the exception that the 30 grams of ethoxyethyl acetate were replaced with 60 grams 2-heptanone and the post-reaction initiator used was Initiator I (1.0 grams in 22.3 grams of 2-heptanone). The resulting resin solution contained 69 percent by weight solids and had a hydroxyl number of approximately 87 mg KOH/gm resin.

The prepartion of the cured coating composition in Example 12 was also repeated with the exception that the following ingredients were used in the following amounts:
  Above Resin Solution—144.9 grams
  Crosslinker I—34.7 grams
  Catalyst I—0.83 grams
  n-Butanol—4.95 grams The cured film coating was tested for the specific properties designated in Table C. The results of the testing are given in Table C.

EXAMPLE 15

The preparation of the monomer mixture in Example 12 was repeated with the exception that the following ingredients were used in the following amounts:
  Reactive Monomer VI—88.0 grams
  Hydroxyethyl acrylate—32.6 grams
  Styrene—79.6 grams
  Butyl acrylate—99.0 grams
  Acrylic acid—8.2 grams
  t-Dodecylmercaptan—7.07 grams
  Initiator I—4.2 grams in 20 grams 2-heptanone This mixture gives an average of two equivalents of caprolactone per equivalent of hydroxyethyl acrylate.

The preparation of the resin solution in Example 12 was repeated with the exception that the 30 grams of ethoxyethyl acetate were replaced with 60 grams of 2-heptanone and the post-reaction initiator was Initiator I (1.0 grams in 22.3 grams of 2-heptanone). The resulting resin solution contained 69 percent by weight solids and had a hydroxyl number of approximately 87 mg KOH/gm resin.

The preparation of the cured coating composition in Example 12 was also repeated with the exception that the following ingredients were used in the following amounts:
  Above Resin Solution—144.9 grams
  Crosslinker I—34.7 grams
  Catalyst I—0.83 grams
  n-Butanol—4.95 grams The cured film coating was tested for the specific properties designated in Table C. The results of the testing are given in Table C.

COMPARATIVE EXAMPLE A

Part A: Preparation of Monomer Mixture

A monomer mixture was prepared by combining 81.2 grams of hydroxyethyl acrylate with 158.8 grams of styrene, 197.6 grams of n-butyl acrylate and 16.4 grams of acrylic acid. To the monomer mixture was added 13.6 grams of t-dodecylmercaptan and 7.95 grams of Initiator I in 50 grams of 2-heptanone.

Part B: Preparation of Unmodified Resin Solution

Into a one liter, three-neck reaction flask equipped with a nitrogen inlet and outlet, condenser, thermometer, stirrer, and monomer mixture addition tube was added 50 grams of 2-heptanone which was heated to 115° C. At this temperature, the above monomer mixture was added into the reaction flask through the monomer mixture addition tube over a period of three hours. The addition of the monomer mixture was regulated by means of mechanical metering pump. After the addition of all the monomer mixture into the reaction flask, the temperature of the contents in the flask was lowered to 80° C. and 1.0 grams of Initiator I (post reaction) in 23.5 grams of 2-heptanone was added dropwise over a period of 15 minutes. The temperature was maintained at 80° C. for one additional hour following the dropwise addition of Initiator I and the resulting unmodified resin solution was thereafter removed from the reaction flask. The resin solution contained 75 percent by weight solids.

Part C: Preparation of Cured Coating Composition

A coating composition was prepared containing 133.0 grams of the above resin solution, 40.7 grams of Crosslinker I, 0.83 grams of Catalyst I and 4.95 grams of n-butanol. The coating composition was mixed until homogeneous and then applied to Bonderite 100 ® treated steel panels using a drawdown blade with a four mil wet film clearance. The coating film was air dried for about 20 minutes and then cured by baking for 20 minutes at 150° C. The cured coating film was thereafter cooled to ambient temperature before testing for the specific properties designated in Table C. The results of the testing are given in Table C.

COMPARATIVE EXAMPLE B

Part A: Preparation of Monomer Mixture and Unmodified Resin Solution

The preparation of the monomer mixture and unmodified resin solution in Comparative Example A was repeated and the resulting unmodified resin solution was retained in the reaction flask.

Part B: Preparation of Caprolactone Grafted Resin Solution

Into the reaction flask containing 533 grams of the above unmodified resin solution was added 140 grams of caprolactone and 0.006 grams of Catalyst II. The amount of caprolactone was equivalent to the amount of caprolactone used in Example 12, i.e., two equivalents of caprolactone per equivalent of hydroxyethyl acrylate. The contents of the flask were heated to 140° C. and maintained at this temperature for a period of three hours. The grafting reaction of the caprolactone onto the above unmodified resin was monitored throughout this period by gas chromatography. The resulting caprolactone modified resin solution was thereafter removed from the reaction flask. The resin solution contained 82 percent by weight solids.

Part C: Preparation of Cured Coating Composition

A coating composition was prepared containing 123.0 grams of the above resin solution, 33.0 grams of Crosslinker I, 0.83 grams of Catalyst I, 4.95 grams of n-butanol and 4.75 grams of 2-heptanone. The coating composition was mixed until homogeneous and then applied to Bonderite 100 ® treated steel panels using a drawdown blade with a four mil wet film clearance. The coating film was air dried for about 20 minutes and then cured by baking for 20 minutes at 150° C. The cured coating film was thereafter cooled to ambient temperature before testing for the specific properties designated in Table C. The results of the testing are given in Table C.

COMPARATIVE EXAMPLE C

The preparation of the monomer mixture, unmodified resin solution, caprolactone grafted resin solution and the cured coating composition in Comparative Example B was repeated with the exception that 175 grams of caprolactone was used instead of 140 grams of caprolactone as used in Comparative Example B, i.e., 2.5 equivalents of caprolactone per equivalent of hydroxyethyl acrylate were used instead of 2.0 equivalents of caprolactone per equivalent of hydroxyethyl acrylate. The resulting cured coating film was tested for the specific properties designated in Table C. The results of the testing are given in Table C.

TABLE C

COMPARISON OF METHODS FOR INTRODUCING CAPROLACTONE INTO POLYMERS AND THEIR RESULTING COATING PROPERTIES

| Example or Comparative Example | Polymer Composition Monomer (Mole Fraction) | Caprolactone Content* | Forward Impact (in./lbs.) | Pencil Hardness |
|---|---|---|---|---|
| 12 | STY/BA/HEA.2CL/AA (0.387/0.392/0.164/0.058) | 2.0 | 100 | F |
| 13 | STY/BA/HEA/HEA.4CL/AA (0.382/0.386/0.0875/0.0875/0.057) | 2.0 | 100 | F |
| 14 | STY/BA/HEA/HEA.6CL/AA (0.382/0.386/0.117/0.058/0.057) | 2.0 | 80 | HB |
| 15 | STY/BA/HEA/HEA.10CL/AA (0.382/0.386/0.140/0.035/0.057) | 2.0 | 60 | F |
| A | STY/BA/HEA/AA (0.382/0.386/0.175/0.057) | 0.0 | 10 | F |
| B | Resin of Comparative Example A grafted with caprolactone. | 2.0 | 40 | HB |
| C | Resin of Comparative Example A grafted with caprolactone | 2.5 | 100 | HB |

*Caprolactone content reported in moles of caprolactone per equivalent of hydroxyl in polymer.

Table C shows the properties obtained when caprolactone is added to a polymer by grafting (Comparative Examples B and C) and by addition polymerization of caprolactone modified reactive monomers having ethylenic unsaturation (Examples 12 through 15). At equivalent caprolactone content, the forward impact for the polymer compositions of Examples 12 through 15 is significantly higher than the forward impact of Comparative Example B and also Comparative Example A which was not modified with caprolactone. Pencil hardness is generally higher for the polymer compositions of Examples 12 through 15 in comparison with Comparative Example B at equivalent caprolactone content.

In addition to the specific properties tested for in Table C, all of the final coatings prepared from the polymers in Examples 12 through 15 and Comparative Examples A through C exhibited excellent crosshatch adhesion and resistance to methyl ethyl ketone (2-butanone). The coatings of Examples 12 and 13 were further tested for potential chipping resistance by a gravelometer at −10° F. to give the following results:

| Coating Identification | Dry Coating Thickness | Gravelometer Rating |
| --- | --- | --- |
| Example 12 | 2.5 mil | 5A, 6A |
| Example 13 | 5.0 mil | 6A, 7B |

The results show excellent chipping resistance for the coating of Example 12.

EXAMPLE 16

The preparation of the monomer mixture in Example 12 was repeated with the exception that the following ingredients were used in the following amounts:
   Reactive MonomerII—75.0 grams
   Styrene—26.1 grams
   t-Butyl acrylate—46.6 grams
   n-Butyl acrylate—44.5 grams
   Acrylic acid—5.1 grams
   t-Dodecylmercaptan—4.4 grams
   Initiator I—2.6 grams in 21 grams of 2-heptanone
   Ethoxyethyl Acetate/Toluene (2:1 weight ratio)—44.0 grams The preparation of the resin solution in Example 12 was repeated with the exception that the 30 grams of ethoxyethyl acetate were replaced with 50 grams of 2-heptanone and the post reaction initiator used was Initiator I (0.42 grams in 21 grams of 2-heptanone). The resulting resin solution contained 59 percent by weight solids and had a hydroxyl number of approximately 122 mg KOH/gm resin.

The preparation of the cured coating composition in Example 12 was also repeated with the exception that the following ingredients were used in the following amounts:
   Above Resin Solution—167.0 grams
   Crosslinker I—48.8 grams
   Catalyst I—0.83 grams
   n-Butanol—4.95 grams The cured film coating was tested for the specific properties designated in Table D. The results of the testing are given in Table D.

EXAMPLE 17

The preparation of the monomer mixture in Example 12 was repeated with the exception that the following ingredients were used in the following amounts:
   Reactive Monomer II—60.3 Grams
   Styrene—20.8 grams
   t-Butyl acrylate—21.4 grams
   Ethyl acrylate—40.1 grams
   Acrylic acid—4.1 grams
   t-Dodecylmercaptan—3.53 grams
   Initiator I—2.07 grams in 10 grams of 2-heptanone The preparation of the resin solution in Example 12 was repeated with the exception that the 30 grams of ethoxyethyl acetate were replaced with 30 grams of 2-heptanone and the post reaction initiator was Initiator I (0.5 grams in 8.7 grams of 2-heptanone). The resulting resin solution contained 69.7 percent by weight solids and had a hydroxyl number of approximately 87 mg KOH/gm resin.

The preparation of the cured coating composition in Example 12 was also repeated with the exception that the following ingredients were used in the following amounts:
   Above Resin Solution—143.5 grams
   Crosslinker I—34.7 grams
   Catalyst I—0.83 grams
   n-Butanol—4.95 grams The cured film coating was tested for the specific properties designated in Table D. The results of the testing are given in Table D.

EXAMPLE 18

The preparation of the monomer mixture in Example 12 was repeated with the exception that the following ingredients were used in the following amounts:
   Reactive Monomer II—75.5 grams
   Methyl methacrylate—26.1 grams
   t-Butyl acrylate—46.6 grams
   n-Butyl acrylate—44.5 grams
   Acrylic acid—5.1 grams
   t-Dodecylmercaptan—4.4 grams
   Initiator I—2.6 grams in 20 grams of 2-heptanone The preparation of the resin solution in Example 12 was repeated with the exception that the 30 grams of ethoxyethyl acetate were replaced with 36 grams of 2-heptanone and the post reaction initiator was Initiator I (0.5 grams in 10 grams of 2-heptanone). The resulting resin solution contained 73 percent by weight solids and had a hydroxyl number of approximately 97 mg KOH/gm resin.

The preparation of the cured coating composition in Example 12 was also repeated with the exception that the following ingredients were used in the following amounts:
   Above Resin Solution—137.0 grams
   Crosslinker I—38.8 grams
   Catalyst I—0.83 grams
   n-Butanol—4.95 grams The cured film coating was tested for the specific properties designated in Table D. The results of the testing are given in Table D.

EXAMPLE 19

The preparation of the monomer mixture in Example 12 was repeated with the exception that the following ingredients were used in the following amounts:
   Reactive Monomer II—60.2 grams
   t-Butyl acrylate—67.9 grams
   Ethyl acrylate—23.8 grams
   Acrylic acid—4.1 grams
   t-Dodecylmercaptan—3.5 grams
   Initiator I—2.05 grams in 11.3 grams of 2-heptanone The preparation of the resin solution in Example 12 was repeated with the exception that the 30 grams of ethoxyethyl acetate were replaced with 30 grams of 2-heptanone and the post reaction initiator was Initiator I (0.5 grams in 10 grams of 2-heptanone). The resulting resin solution contained 72 percent by weight solids and had a hydroxyl number of approximately 76 mg KOH/gm resin.

The preparation of the cured coating composition in Example 12 was also repeated with the exception that the following ingredients were used in the following amounts:
 Above Resin Solution—138.9 grams
 Crosslinker I—30.4 grams
 Catalyst I—0.83 grams
 n-Butanol—4.95 grams The cured film coating was tested for the specific properties designated in Table D. The results of the testing are given in Table D.

EXAMPLE 20

The preparation of the monomer mixture in Example 12 was repeated with the exception that the following ingredients were used in the following amounts:
 Reactive Monomer II—75.0 grams
 Styrene—26.1 grams
 t-Butyl acrylate—46.6 grams
 Decyl acrylate—73.7 grams
 Acrylic acid—5.1 grams
 t-Dodecylmercaptan—2.2 grams
 Initiator I—2.6 grams in 20 grams of 2-heptanone The preparation of the resin solution in Example 12 was repeated with the exception that the 30 grams in ethoxyethyl acetate were replaced with 36 grams of 2-heptanone and the post reaction initiator was Initiator I (0.5 grams in 10 grams of 2-heptanone). The resulting resin solution contained 68 percent by weight solids and had a hydroxyl number of approximately 90 mg KOH/gm resin.

The preparation of the cured coating composition in Example 12 was also repeated with the exception that the following ingredients were in the following amounts:
 Above Resin Solution—147.1 grams
 Crosslinker I—36.0 grams
 Catalyst I—0.83 grams
 n-Butanol—4.95 grams The cured film coating was tested for the specific properties designated in Table D. The results of the testing are given in Table D.

EXAMPLE 21

The preparation of the monomer mixture in Example 12 was repeated with the exception that the following ingredients were used in the following amounts:
 Reactive Monomer II—60.2 grams
 Styrene—20.8 grams
 Cyclohexyl acrylate—58.4 grams
 n-Butyl acrylate—24.2 grams
 Acrylic acid—4.1 grams
 t-Dodecylmercaptan—3.53 grams
 Initiator I—2.07 grams in 10 grams of 2-heptanone The preparation of the resin solution in Example 12 was repeated with the exception that the 30 grams of ethoxyethyl acetate were replaced with 36 grams of 2-heptanone and the post reaction initiator was Initiator I (0.5 grams in 10 grams of 2-heptanone). The resulting resin solution contained 69 percent by weight solids and had a hydroxyl number of approximately 84 mg KOH/gm resin.

The preparation of the cured coating composition in Example 12 was also repeated with the exception that the following ingredients were used in the following amounts:
 Above Resin Solution—144.7 grams
 Crosslinker I—33.6 grams
 Catalyst I—0.83 grams
 n-Butanol—4.95 grams The cured film coating was tested for the specific properties designated in Table D. The results of the testing are given in Table D.

EXAMPLE 22

The preparation of the monomer mixture in Example 12 was repeated with the exception that the following ingredients were used in the following amounts:
 Reactive Monomer III—115.3 grams
 Styrene—79.4 grams
 n-Butyl acrylate—98.8 grams
 Acrylic acid—8.2 grams
 t-Dodecylmercaptan—6.8 grams
 Initiator I—4.0 grams in 30 grams of ethoxyethyl acetate
 Ethoxyethyl Acetate/Toluene (2:1 weight ratio)—67.7 grams The preparation of the resin solution in Example 12 was repeated. The resulting resin solution contained 63 percent by weight solids and had a hydroxyl number of approximately 79 mg KOH/gm resin.

The preparation of the cured coating composition in Example 12 was also repeated with the exception that the following ingredients were used in the following amounts:
 Above Resin Solution—80.0 grams
 Crosslinker I—15.8 grams
 Catalyst I—0.44 grams
 n-Butanol—2.5 grams The cured film coating was tested for the specific properties designated in Table D. The results of the testing are given in Table D.

EXAMPLE 23

The preparation of the monomer mixture in Example 12 was repeated with the exception that the following ingredients were used in the following amounts:
 Reactive Monomer III—75.5 grams
 Styrene—26.1 grams
 t-Butyl acrylate—46.6 grams
 n-Butyl acrylate—44.5 grams
 Acrylic acid—5.1 grams
 t-Dodecylmercaptan—4.4 grams
 Initiator I—2.6 grams in 21 grams of 2-heptanone
 Ethoxyethyl Acetate/Toluene (2:1 weight ratio)—43.6 grams The preparation of the resin solution in Example 12 was repeated with the exception that the 30 grams of ethoxyethyl acetate were replaced with 50 grams of 2-heptanone and the post reaction initiator was Initiator I (0.42 in 21 grams of 2-heptanone). The resulting resin solution contained 53 percent by weight solids and had a hydroxyl number of approximately 83 mg KOH/gm resin. This material was vacuum stripped to 75 percent by weight solids.

The preparation of the cured coating composition in Example 12 was also repeated with the exception that the following ingredients were used in the following amounts:

Above Resin Solution—133.3 grams
Crosslinker I—32.2 grams
Catalyst I—0.83 grams
n-Butanol—4.95 grams The cured film coating was tested for the specific properties designated in Table D. The results of the testing are given in Table D.

TABLE D

POLYMERS PREPARED WITH REACTIVE MONOMERS II AND III AND THEIR RESULTING COATING PROPERTIES

| Example | Polymer Composition Monomer (Mole Fraction) | Caprolactone Content* | Forward Impact (in./lbs.) | Pencil Hardness |
|---|---|---|---|---|
| 16 | STY/TBA/BA/HEA.2CL/AA (0.201/0.291/0.277/0.174/0.057) | 2.0 | 70 | F |
| 17 | STY/TBA/EA/HEA.2CL/AA (0.200/0.167/0.401/0.175/0.057) | 2.0 | 70 | F |
| 18 | MMA/TBA/BA/HEA.2CL/AA (0.207/0.288/0.275/0.174/0.057) | 2.0 | 70 | F |
| 19 | TBA/EA/HEA.2CL/AA (0.530/0.238/0.175/0.057) | 2.0 | 80 | F |
| 20 | STY/TBA/DA/HEA.2CL/AA (0.201/0.291/0.277/0.174/0.057) | 2.0 | 90 | F |
| 21 | STY/CHA/BA/HEA.2CL/AA (0.200/0.379/0.189/0.175/0.057) | 2.0 | 70 | H |
| 22 | STY/BA/HEMA.2CL/AA (0.387/0.392/0.164/0.058) | 2.0 | 80 | F |
| 23 | STY/TBA/BA/HEMA.2CL/AA (0.202/0.293/0.279/0.170/0.057) | 2.0 | 30 | F |

*Caprolactone content reported in moles of caprolactone per equivalent of hydroxyl in polymer.

Table D shows the properties obtained when caprolactone is added to a polymer by addition polymerization of Rective Monomer II or Reactive Monomer III with other ethylenically unsaturated monomers. The final coatings prepared from the polymers in Examples 16 through 23 generally exhibit good or excellent forward impact and pencil hardness.

In addition to the specific properties tested for in Table D, all of the final coatings prepared from the polymers in Examples 16 through 23 exhibited excellent crosshatch adhesion and resistance to methylethyl ketone (2-butanone). The coating of Example 16 was further tested for potential chipping resistance by a gravelometer to give the following results:

| Coating Identification | Dry Coating Thickness | Gravelometer Rating |
|---|---|---|
| Example 16 | 2.5 mil | 5A, 5B |

The results show excellent chipping resistance for the coating of Example 16.

EXAMPLE 24

Part A: Preparation of Monomer Mixture and Resin Solution

A monomer mixture was prepared in a stainless steel high pressure container cooled to −78° C. by combining 55.4 grams of Reactive Monomer II with 2.2 grams of vinyl acetate. To the monomer mixture was added 1.4 grams of t-dodecylmercaptan, 0.7 grams of Initiator I and 24.2 grams of 2-butanone. Into a separate reaction flask also cooled to −78° C. was added 51.0 grams of vinyl chloride and 101 grams of 2-butanone. The contents of the reaction flask were added into the stainless steel high pressure container which was then sealed and placed in a heating bath at 50° C. for a period of 24 hours. After the 24 hour period, the stainless steel high pressure container was cooled to ambient temperature, opened and the contents were removed with the aid of additional 2-butanone. The resulting resin solution was vacuum stripped to give a resin solution containing 62 percent by weight solids.

Part B: Preparation of Cured Coating Composition

A coating composition was prepared containing 40.3 grams of the above resin solution, 8.3 grams of Crosslinker I, 0.21 grams of Catalyst I and 1.24 grams of n-butanol. The coating composition was mixed until homogeneous and then applied to Bonderite 100 ® treated steel panels using a drawdown blade with a 4 mil wet film clearance. The coating film was air dried for about 20 minutes and then cured by baking for 15 minutes at 125° C. The cured coating film was thereafter cooled to ambient temperature before testing for the specific properties designated in Table E. The results of the testing are given in Table E.

EXAMPLE 25

The preparation of the monomer mixture and resin solution in Example 24 was repeated with the exception that the following ingredients were used in the following amounts:

Reactive Monomer V—43.2 grams
Vinyl acetate—2.2 grams
Vinyl chloride—51.0 grams
Hydroxyethyl acrylate—12.4 grams
Initiator I—0.7 grams
t-Dodecylmercaptan—1.4 grams
2-Butanone—125.0 grams The resulting resin solution contained 68 percent by weight solids for vacuum stripping.

The preparation of the cured coating composition in Example 24 was also repeated with the exception that the following ingredients were used in the following amounts:

Above Resin Solution—36.8 grams
Crosslinker I—8.3 grams
Catalyst I—0.21 grams
n-Butanol—1.2 grams The cured film coating was tested for the specific properties designated in Table E. The results of the testing are given in Table E.

EXAMPLE 26

The preparation of the monomer mixture and resin solution in Example 24 was repeated with the exception that the following ingredients were used in the following amounts:
- Reactive Monomer VI—60.0 grams
- Vinyl acetate—2.5 grams
- Vinyl chloride—60.0 grams
- Initiator I—0.8 grams
- t-Dodecylmercaptan—1.5 grams
- 2-Butanone—181.0 grams The resulting resin solution contained 82 percent by weight solids after vacuum stripping.

The preparation of the cured coating composition in Example 24 was also repeated with the exception that the following ingredients were used in the following amounts:
- Above Resin Solution—30.8 grams
- Crosslinker I—2.2 grams
- Catalyst I—0.21 grams
- n-Butanol—1.2 grams The cured film coating was tested for the specific properties designated in Table E. The results of the testing are given in Table E.

EXAMPLE 27

The preparation of the monomer mixture and resin solution in Example 24 was repeated with the exception that the following ingredients were used in the following amounts:
- Reactive Monomer II—13.0 grams
- Vinyl acetate—2.0 grams
- Vinyl chloride—85.0 grams
- Initiator I—1.0 grams
- t-Dodecylmercaptan—1.4 grams
- 2-Butanone—93.0 grams The resulting resin solution contained 47 percent by weight solids.

The preparation of the cured coating composition in Example 24 was also repeated with the exception that the following ingredients were used in the following amounts:
- Above Resin Solution—41.0 grams
- Crosslinker I—1.5 grams
- Catalyst I—0.14 grams
- n-Butanol—0.8 grams Also, the coating composition was applied to Bonderite 100 ® treated steel panels using a drawdown blade with a 10 mil wet film clearance. The coating film was air dried for 15 minutes and then cured by baking for 15 minutes at 125° C. The cured film coating was thereafter cooled to ambient temperature and tested for the specific properties designated in Table E. The results of the testing are given in Table E.

EXAMPLE 28

The preparation of the monomer mixture and resin solution in Example 24 was repeated with the exception that the following ingredients were used in the following amounts:
- Reactive Monomer II—13.0 grams
- Vinyl acetate—2.0 grams
- Vinyl chloride—110.0 grams
- Hydroxyethyl acrylate—12.4 grams
- Initiator I—1.5 grams
- t-Dodecylmercaptan—1.5 grams
- Ethoxyethyl acetate—92.6 grams The resulting resin solution contained 35 percent by weight solids.

A pigment grind was then prepared by grinding in a sand mill to a Hegeman fineness of 7 the following: 51.0 grams of titanium dioxide (rutile); 182 grams of the above resin solution; 0.5 grams of Dispersing Aid I; and 58 grams of 2-butanone. To a 10 gram sample of this resinous pigment grind was added 0.868 grams of Crosslinker II and one drop of Catalyst III. The coating composition was mixed until homogeneous and then applied to Bonderite 100 ® treated steel panels using a drawdown blade with a 6 mil wet film clearance. The coating film was allowed to cure for three days at ambient temperature before testing for the specific properties designated in Table E. The results of the testing are given in Table E.

COMPARATIVE EXAMPLE D

The preparation of the monomer mixture and resin solution in Example 24 was repeated with the exception that the following ingredients were used in the following amounts:

Stainless Steel High Pressure Container

- Hydroxyethyl Acrylate—29.0 grams
- Vinyl acetate—3.5 grams
- Initiator I—1.0 grams
- 2-Butanone—8.05 grams Reactive Flask

- Vinyl Chloride—79.0 grams
- 2-Butanone—101.0 grams

The resulting resin solution contained 46 percent by weight solids.

The preparation of the cured composition in Example 24 was also repeated with the exception that the following ingredients were used in the following amounts:
- Above Resin Solution—54.4 grams
- Crosslinker I—12.7 grams
- Catalyst I—0.21 grams
- n-Butanol—1.25 grams Also, the coating film was air dried for about 20 minutes and then cured by baking for 10 minutes at 125° C. The cured coating film was thereafter cooled to ambient temperature before testing for the specific properties designated in Table E. The results of the testing are given in Table E.

TABLE E

POLYMERS PREPARED WITH VINYL CHLORIDE AND CAPROLACTONE MODIFIED HYDROXYETHYL ACRYLATE

| Example | Polymer Composition Monomer (Mole Fraction) | Caprolactone Content* | Forward Impact (in./lbs.) | Pencil Hardness |
|---|---|---|---|---|
| 24 | VCl/HEA.2CL/VAc (0.813/0.160/0.026) | 2.0 | 70 | F |
| 25 | VCl/HEA.6CL/HEA/VAc (0.814/0.106/0.054/0.026) | 2.0 | 45 | F |
| 26 | VCl/HEA.10CL/VAc (0.926/0.046/0.028) | 10.0 | 160 | 4B |
| 27 | VCl/HEA.2CL/VAc (0.957/0.027/0.016) | 2.0 | 160 | 3H |

TABLE E-continued
POLYMERS PREPARED WITH VINYL CHLORIDE AND CAPROLACTONE MODIFIED HYDROXYETHYL ACRYLATE

| Example | Polymer Composition Monomer (Mole Fraction) | Caprolactone Content* | Forward Impact (in./lbs.) | Pencil Hardness |
|---|---|---|---|---|
| 28 | VCl/HEA.2CL/VAc (0.967/0.021/0.013) | 2.0 | 140 | H |
| D | VCl/HEA/VAc (0.813/0.161/0.026) | 0 | <10 | 2H |

*Caprolactone content reported in moles of caprolactone per equivalent of hydroxyl in polymer.

Table E shows the properties obtained when caprolactone is added to a polymer by addition polymerization of either Reactive Monomer II, Reactive Monomer V or Reactive Monomer VI with vinyl chloride and other ethylenically unsaturated monomers. The forward impact for the polymer compositions of Examples 24 through 28 is significantly higher than the forward impact of Comparative Example D which was not modified with caprolactone. In addition to the specific properties tested for in Table E, all of the final coatings prepared from the polymers in Examples 24 through 28 and Comparative Example D exhibited excellent crosshatch adhesion and resistance to methylethyl ketone (2-butanone).

EXAMPLE 29

A pigment grind was prepared by grinding in a sand mill to a Hegeman fineness of 7 the following: 202.13 grams of titanium dioxide (rutile); 250 grams of the resin solution prepared in Example 12; 15.74 grams of ethoxyethyl acetate and 9.19 grams of 2-heptanone. To this resinous pigment grind was added 78.64 grams of Crosslinker I, 2.55 grams of Catalyst IV, 11.6 grams of ethoxyethyl acetate, 65.9 grams of 2-heptanone and 57.85 grams of n-butanol. The resulting white coating composition had a viscosity of 31 seconds using a No. 4 Ford cup. The coating composition was mixed until homogeneous and then applied to Bonderite 100 ® treated steel panels using a drawdown blade with a 4 mil wet film clearance. The coating film was air dried for 15 minutes and then cured by baking for 30 minutes at 250° F. The cured coating film was thereafter cooled to ambient temperature before testing for the specific properties designated below. The results of the testing are also given below.

Forward Impact—140 in-lbs.
Reverse Impact—80 in-lbs.
Pencil Hardness—H
Gloss at 60° C.—90
Gloss at 20° C.—65
Distinctness of Image—70
Gravelometer at −10° F.—6A The results show good or excellent coating properties for the pigmented coating utilizing the resin solution prepared in Example 12.

We claim:

1. A process for preparing a polymeric composition comprising polymerizing one or more ethylenically unsaturated monomers with a composition comprising:
   (a) 0 to 10 weight percent of a lactone;
   (b) greater than 0 weight percent to about 20 weight percent of hydroxyalkyl acrylate or methacrylate;
   (c) 2 or less weight percent of diacrylates;
   (d) 10 or less weight percent of products resulting from Michael addition, acrylic polymerization, transesterification reactions, or other side reactions;
   (e) remainder to 100 weight percent of a reactive monomer of the following formula:

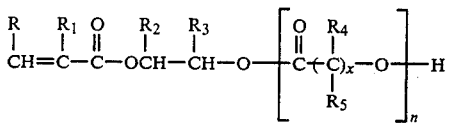

wherein R, $R_1$, $R_2$, and $R_3$ are independently hydrogen or methyl, $R_4$ and $R_5$ are independently hydrogen or alkyl of from 1 to 12 carbon atoms, x is from 4 to 7, and both n and the average value of n in the composition are equal to or greater than 1; and
   (f) less than about 100 parts per million of catalyst.

2. A process as claimed in claim 1 wherein the one or more ethylenically unsaturated monomers are selected from the group consisting of styrene, n-butyl acrylate, 2-hydroxyethyl acrylate, acrylic acid, ethyl acrylate, t-butyl acrylate, methyl methacrylate, decyl acrylate, cyclohexyl acrylate, 2-hydroxyethyl methacrylate, vinyl chloride and vinyl acetate.

3. A process as claimed in claim 1 wherein the lactone in (a) is epsilon-caprolactone.

4. A process as claimed in claim 1 wherein the hydroxyalkyl acrylate or methacrylate in (b) is hydroxyethyl acrylate or methacrylate.

5. A process as claimed in claim 1 wherein the lactone in (a) is present in a concentration of from 0 to 5 weight percent.

6. A process as claimed in claim 1 wherein the hydroxyalkyl acrylate or methacrylate in (b) is present in a concentration of less than 10 weight percent.

7. A process as claimed in claim 1 wherein the diacrylates in (c) are present in a concentration of 1 or less weight percent.

8. A process as claimed in claim 1 wherein the products resulting from Michael addition, acrylic polymerization, transesterification reactions or other side reactions in (d) are present in a concentration of 5 or less weight percent.

9. A process as claimed in claim 1 wherein, in the reactive monomer of (e), R, $R_1$, $R_2$, $R_3$, $R_4$ and $R_5$ are hydrogen, x is five and the average value of n is two.

10. A process as claimed in claim 1 wherein, in the reactive monomer of (e), the average value of n is 1 to 12.

11. A process as claimed in claim 1 wherein, in the reactive monomer of (e), the average value of n is 2 to 3.

12. A process as claimed in claim 1 wherein the one or more ethylenically unsaturated monomers are present at a concentration of from about 5 to about 90 weight percent and the composition comprising (a)

through (f) is present at a concentration of from about 90 to about 5 weight percent.

13. The polymeric composition prepared according to the process of claim 1.

14. A process for preparing a crosslinked polymeric composition comprising:
(1) polymerizing one or more ethylenically unsaturated monomers with a composition comprising:
(a) 0 to 10 weight percent of a lactone;
(b) greater than 0 weight percent to about 20 weight percent of hydroxyalkyl acrylate or methacrylate;
(c) 2 or less weight percent of diacrylates;
(d) 10 or less weight percent of products resulting from Michael addition, acrylic polymerizaton, transesterification reactions, or other side reactions;
(e) remainder to 100 weight percent of a reactive monomer of the following formula:

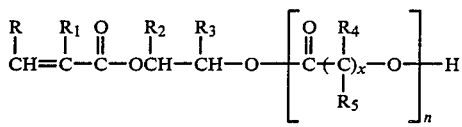

wherein R, $R_1$, $R_2$, and $R_3$ are independently hydrogen or methyl, $R_4$ and $R_5$ are independently hydrogen or alkyl of from 1 to 12 carbon atoms, x is from 4 to 7, and both n and the average value of n in the composition are equal to or greater than 1; and
(f) less than about 100 parts per million of catalyst; and
(2) crosslinking the polymeric composition of (1) with an isocyanate resin or a resin selected from the group consisting of melamine formaldehydes, urea formaldehydes and benzoguanamine formaldehydes.

15. A process as claimed in claim 14 wherein the one or more ethylenically unsaturated monomers are selected from the group consisting of styrene, n-butyl acrylate, 2-hydroxyethyl acrylate, methyl methacrylate, decyl acrylate, cyclohexyl acrylate, 2-hydroxyethyl acrylate, vinyl chloride and vinyl acetate.

16. A process as claimed in claim 14 wherein the lactone in (a) is epsilon-caprolactone.

17. A process as claimed in claim 14 wherein the hydroxyalkyl acrylate or methacrylate in (b) is hydroxyethyl acrylate or methacrylate.

18. A process as claimed in claim 14 wherein the lactone in (a) is present in a concentration of from 0 to 5 weight percent.

19. A process as claimed in claim 14 wherein the hydroxyalkyl acrylate or methacrylate in (b) is present in a concentration of less than 10 weight percent.

20. A process as claimed in claim 14 wherein the diacrylates in (c) are present in a concentration of 1 or less weight percent.

21. A process as claimed in claim 14 wherein the products resulting from Michael addition, acrylic polymerization, transesterification reactions or other side reactions in (d) are present in a concentration of 5 or less weight percent.

22. A process as claimed in claim 14 wherein, in the reactive monomer of (e), R, $R_1$, $R_2$, $R_3$, $R_4$ and $R_5$ are hydrogen, x is five and the average value of n is two.

23. A process as claimed in claim 14 wherein, in the reactive monomer of (e), the average value of n is 1 to 12.

24. A process as claimed in claim 14 wherein, in the reactive monomer of (e), the average value of n is 2 to 3.

25. A process as claimed in claim 14 wherein the one or more ethylenically unsaturated monomers are present at a concentration of from about 5 to about 90 weight percent, the composition comprising (a) through (f) is present at a concentration of from about 90 to about 5 weigt percent and the isocyanate resin or amino resin is present at a concentration of from about 5 to about 50 weight percent.

26. The crosslinked polymeric composition prepared according to the process of claim 14.

* * * * *